US009648895B2

(12) United States Patent
Dombree et al.

(10) Patent No.: US 9,648,895 B2
(45) Date of Patent: May 16, 2017

(54) EMULSION WHIPPABLE AT ROOM-TEMPERATURE

(75) Inventors: Anne Dombree, Brussels (BE); Yves Kegelaers, Brussels (BE); Prudent Placide Anihouvi, Gembloux (BE); Sabine Danthine, Couthuin (BE); Christophe Blecker, Forville (BE)

(73) Assignee: Puratos N.V., Groot-Bijgaarden (BE)

(*) Notice: Subject to any disclaimer, the term of this patent is extended or adjusted under 35 U.S.C. 154(b) by 50 days.

(21) Appl. No.: 13/984,700

(22) PCT Filed: Feb. 13, 2012

(86) PCT No.: PCT/EP2012/052377
§ 371 (c)(1),
(2), (4) Date: Aug. 9, 2013

(87) PCT Pub. No.: WO2012/107587
PCT Pub. Date: Aug. 16, 2012

(65) Prior Publication Data
US 2013/0316064 A1 Nov. 28, 2013

(30) Foreign Application Priority Data
Feb. 11, 2011 (EP) ..................................... 11154247

(51) Int. Cl.
A23G 3/40 (2006.01)
A23C 11/04 (2006.01)
A23D 7/00 (2006.01)
A23D 7/005 (2006.01)
A23D 7/04 (2006.01)
A23G 3/52 (2006.01)
A23L 9/20 (2016.01)

(52) U.S. Cl.
CPC ................ *A23G 3/40* (2013.01); *A23D 7/003* (2013.01); *A23D 7/0053* (2013.01); *A23D 7/04* (2013.01); *A23G 3/52* (2013.01); *A23L 9/20* (2016.08); *A23L 9/22* (2016.08); *A23V 2002/00* (2013.01)

(58) Field of Classification Search
CPC ........... A23G 3/40; A23L 1/193; A23D 7/003; A23V 2250/1944
See application file for complete search history.

(56) References Cited

U.S. PATENT DOCUMENTS 6,117,473 A 9/2000 Leshik et al.
6,203,841 B1 * 3/2001 Lynch et al. .................. 426/564
2005/0048184 A1 * 3/2005 Arnould et al. .............. 426/564

FOREIGN PATENT DOCUMENTS

| EP | 1662899 A1 | 6/2006 |
|----|------------|--------|
| JP | 10155448 A | 6/1998 |
| JP | 2006149229 A | 6/2006 |
| JP | 201075071 A | 4/2010 |
| WO | 9831236 A1 | 7/1998 |
| WO | 0141586 A1 | 6/2001 |
| WO | 2004052114 A1 | 6/2004 |
| WO | 2004084656 A1 | 10/2004 |
| WO | 2009102040 A1 | 8/2009 |

OTHER PUBLICATIONS

YCW76 "Fatty Acid Composition of Palm Oil, Palm Oil Fractions and Palm Kernel Oil" WordPress.com Feb. 3, 2014, pp. 1-5.*
Siddiq (ed.) "Tropical and Subtropical Fruits Postharvest Physiology Processing and Packing" Wiley-Blackwell 2012, p. 173.*
International Search Report and Written Opinion issued Mar. 21, 2012 in PCT/EP2012/052377, 10 pages.
EPO Communication pursuant to Article 94(3) EPC and Annex issued in European Application No. 12705635.6, dated Jan. 1, 2013, 3 pages.
Bezard, J.A., "The Component Triglycerides of Palm-Kernel Oil," 1971, Lipids, 6/9:630-635. Abstract Only.
Neff, W.E., et al., "Triacylglycerol Structures of Food Fats High in Saturated Acids by HPLC and Mass Spectrometry," 2001, J Liq Chrom & Rel Technol, 24(6), 837-854.

* cited by examiner

*Primary Examiner* — Kelly Bekker
(74) *Attorney, Agent, or Firm* — Senniger Powers LLP

(57) ABSTRACT

The present invention relates to an oil-in-water emulsion for whipped cream and to a whipped cream obtained by whipping the emulsion. In particular, the present invention relates to a stabilized whippable oil-in-water emulsion upon increasing the trilaurin triglyceride content of its oily phase, and to the stabilized cream obtained by whipping the emulsion. The present invention further relates to the methods for obtaining this emulsion and this cream, and to the uses of an oil-in-water emulsion according to the invention or of the stabilized cream according to the invention.

15 Claims, 2 Drawing Sheets

EMULSION WHIPPABLE AT ROOM-TEMPERATURE

REFERENCE TO RELATED APPLICATIONS

This application is the United States National Stage Application of International Application No. PCT/EP2012/052377, filed Feb. 13, 2012, and claims the benefit of European Patent Application No. 11154247.8, filed Feb. 11, 2011, the entire disclosures of which are incorporated herein by reference.

FIELD OF THE INVENTION

The present invention relates to an oil-in-water emulsion for whipped cream and to a whipped cream obtained by whipping the emulsion.

In particular, the present invention relates to a stabilized whippable oil-in-water emulsion upon increasing the trilaurin triglyceride content of its oily phase, and to the stabilized cream obtained by whipping the emulsion.

The present invention further relates to the methods for obtaining this emulsion and this cream, and to the uses of an oil-in-water emulsion according to the invention or of the stabilized cream according to the invention.

BACKGROUND OF THE INVENTION AND STATE OF THE ART

In food industry, vegetable creams are reconstituted oil-in-water emulsions formulated with a vegetable fat, emulsifiers and stabilizers. These creams are whipped to give a stiff and smooth product that is subsequently used for different applications in fine patisserie like fillings (choux, bavarois) or decorations on celebration cakes, etc.

Vegetable creams are used as alternative to dairy products like fresh creams and Chantilly. The exclusive use of vegetable fat gives products containing less fat and hence less calories and that are essentially free of trans fatty acids, cholesterol and lactose.

For the patisserie chef, vegetable creams can confer advantages compared to fresh dairy creams, which are a short whipping time, the tolerance to over-whipping, a constant overrun, the stability of the whipped creams against temperature, the sculptability and good mouthfeel and smoothness.

Two types of vegetable creams are currently produced: UHT (Ultra High Temperature) vegetable creams and pasteurized vegetables creams.

Pasteurized products are heated up to 90° C. These products are then packed and frozen for prolonged conservation. Before use, they have to be thawed. That means that a cake decorated with this whipped product should not be frozen. From a logistic point of view, it is very important to have a good controlled cold chain, and this limits the distribution to zones where such a cold chain can be assured.

Currently available UHT creams are sterilized by heating to 140° C. for a short time by injection of steam and packed in aseptic packages like Tetra Pak or bag-in-box. Such creams need to be stored under 20° C. to avoid destabilization (presence of lumps or hardening of the product).

Patent EP 1 662 899 B1 describes a protein-free UHT treated non-dairy vegetable oil-in-water emulsion for whipping comprising 20-30% fully hydrogenated fat of lauric origin, 10-25%, sweetener, stabilizers and emulsifier.

Patent application WO 2004/084 656 describes a non-dairy whippable food comprising at least 30% triglyceride fats, emulsifiers, stabilizers and proteins.

U.S. Pat. No. 6,117,473 discloses an oil-in water emulsion based on hydrogenated coconut and PKO oils being stabilized by gelatin and non-proteinic emulsifiers.

JP 2006/149 229 discloses an aerosol whipped cream based on fats or oils with a mean iodine value lower than 40, sucrose ester having a HLB lower than 7 and either sucrose ester or polysorbate having HLB higher than 10.

Today however all UHT vegetable creams that can be stored at room temperature, when packed for example in Tetra Pak, must be whipped at a low temperature, generally below 10° C., in order to obtain a good overrun. If the product is whipped at higher temperature the density is higher and the volume is lower. The industry is facing a logistic constraint and extra costs due to this additional cooling step.

There is therefore a need for vegetable creams that can be whipped not only at low temperature (e.g. at temperature lower than 10° C.), but also at temperature over 10° C., for example up to 25° C., which will facilitate the handling and the process.

SUMMARY OF THE INVENTION

The present invention relates to a method for stabilizing an edible oil-in-water emulsion (or a whipped edible oil-in-water emulsion) comprising the step of mixing the oily phase with the aqueous phase, said oily phase comprising (preferably comprising mainly, or more preferably consisting essentially of) a fat, preferably a vegetable fat, more preferably a vegetable lauric fat, enriched in trilaurin triglyceride.

More particularly, the present invention relates to a method for stabilizing an edible oil-in-water emulsion comprising the step of mixing a fat, preferably a vegetable fat, with the aqueous phase, said fat being enriched in trilaurin triglyceride.

Preferably, said oil-in-water emulsion is an edible UHT-treated oil-in-water emulsion.

The present invention also relates to a method for stabilizing a whipped edible oil-in-water emulsion, preferably a whipped edible UHT-treated oil-in-water emulsion, comprising the step of mixing a fat, preferably a vegetable fat, with the aqueous phase, said fat being enriched in trilaurin triglyceride.

Preferably, said fat, in particular said vegetable fat, comprises more than 20% (w/w) of trilaurin triglyceride based on the total amount of the triglycerides in said fat, more preferably more than 21%, even more preferably more than 22% of trilaurin triglyceride.

Preferably, said fat, is a vegetable lauric fat. Preferably, said vegetable lauric fat comprises between 44% and 57% (w/w) of lauric acid, based on the total amount of the fatty acids in the fat.

Preferably, a method for stabilizing the (whipped) emulsion, further comprises the step of adding a sucrose ester.

Preferred sucrose esters are selected from the group consisting of sucrose mono-stearate, sucrose mono-palmitate, sucrose mono-oleate, sucrose mono-myristate, sucrose mono-laurate, and combination thereof.

Preferably, said sucrose esters comprise mainly (i.e. as the main component) sucrose mono-stearate.

Preferably, said sucrose esters comprise (or consist of) at least 50%, more preferably at least 70% (w:w) of sucrose mono-stearate, and one or more other sucrose esters up to 100%. More preferably, said sucrose esters comprise (or consist of) at least 70% (w:w) of sucrose mono-stearate, and sucrose di-stearate up to 100%.

Preferably, said sucrose ester is added in an amount comprised between 0.01% (w/w) and 2% (w/w).

Preferably, a method for stabilizing the (whipped) emulsion, further comprises the step of adding a polysorbate.

Preferably, said polysorbate is polysorbate 60 or polysorbate 80, or a mixture of both polysorbate 60 and polysorbate 80. More preferably said polysorbate is polysorbate 60.

Preferably, said polysorbate is added in an amount comprised between 0.1% (w/w) and 1% (w/w).

A preferred method for stabilizing the (whipped) emulsion, comprises both steps of adding said sucrose ester and of adding said polysorbate.

A method for stabilizing the (whipped) emulsion can further comprise the step of adding another emulsifier. Preferably, said other emulsifier is selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and combinations of two or more thereof.

A method for stabilizing the (whipped) emulsion can further comprise the step of adding a stabilizer, said stabilizer being preferably selected from the group consisting of alginate, carrageenan, locust bean gum, guar gum, xanthan gum, microcrystalline cellulose, carboxymethyl-cellulose, sorbitol and combinations of two or more thereof.

The present invention also relates to an edible oil-in-water emulsion, or a whipped edible oil-in-water emulsion, preferably UHT-treated, comprising a fat, preferably a vegetable fat, enriched in trilaurin triglyceride, and/or comprising more than 20% (w/w) of trilaurin triglyceride based on the total amount of the triglycerides in said fat.

In particular, the oily phase of said (whipped) (UHT-treated) edible oil-in-water emulsion comprises, preferably comprises mainly, or more preferably consists essentially of, a fat, preferably a vegetable fat, enriched in trilaurin triglyceride, and/or comprising more than 20% (w/w) of trilaurin triglyceride based on the total amount of the triglycerides in said fat.

Preferably, said fat, in particular said vegetable fat, comprises more than 21% (w/w) of trilaurin triglyceride based on the total amount of the triglycerides in said fat, and more preferably more than 22%.

Preferably, said fat, is a vegetable lauric fat. Preferably, said vegetable lauric fat comprises between 44% and 57% (w/w) of lauric acid, based on the total amount of the fatty acids in the fat.

Preferably, an edible UHT-treated oil-in-water emulsion of the invention comprises between 20% and 30% (w:w) of a vegetable fat, wherein the said vegetable fat comprises more than 20% (w/w) of trilaurin triglyceride based on the total amount of triglycerides in said vegetable fat, more preferably more than 21% (w/w) of trilaurin triglyceride, said vegetable fat being possibly a trilaurin-enriched fat, said edible UHT-treated oil-in-water emulsion further comprising either a sucrose ester, or a polysorbate.

A particularly preferred edible UHT-treated oil-in-water emulsion of the invention comprises both said sucrose ester and said polysorbate.

Preferred sucrose esters are selected from the group consisting of sucrose mono-stearate, sucrose mono-palmitate, sucrose mono-oleate, sucrose mono-myristate, sucrose mono-laurate, and combination thereof.

Preferably, said sucrose esters comprise mainly (i.e. as the main component) sucrose mono-stearate.

Preferably, said sucrose esters comprise (or consist of) at least 50%, more preferably at least 70% (w:w) of sucrose mono-stearate, and one or more other sucrose esters up to 100%. More preferably, said sucrose esters comprise (or consist of) at least 70% (w:w) of sucrose mono-stearate, and sucrose di-stearate up to 100%.

Preferably, said sucrose ester is added in an amount comprised between 0.01% (w/w) and 2% (w/w).

Preferably, said polysorbate is polysorbate 60 or polysorbate 80, or a mixture of both polysorbate 60 and polysorbate 80. More preferably said polysorbate is polysorbate 60.

Preferably, said polysorbate is added in an amount comprised between 0.1% (w/w) and 1% (w/w).

A particularly preferred edible UHT-treated oil-in-water emulsion of the invention comprises both sucrose mono-stearate and polysorbate 60. Said sucrose mono-stearate is preferably between 0.01% (w/w) and 2% (w/w), and said polysorbate 60 preferably is between 0.1% (w/w) and 1% (w/w).

The emulsion according to the invention can further comprise another emulsifier. Preferably, said other emulsifier is selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and combinations thereof.

The emulsion according to the invention can further comprise a stabilizer, preferably selected from the group consisting of alginate, carrageenan, locust bean gum, guar gum, xanthan gum, microcrystalline cellulose, carboxymethylcellulose, sorbitol and combinations thereof.

A preferred edible UHT-treated oil-in-water emulsion of the invention is protein free.

Preferably, an edible UHT-treated oil-in-water emulsion of the invention comprises:

20% to 30% (w:w) of a vegetable lauric fat, possibly a trilaurin-enriched vegetable lauric fat, said fat having a trilaurin triglyceride content higher than 20%, preferably higher than 21%, more preferably higher than 22% (w:w);

0.1% to 1% (w:w) of a polysorbate, preferably polysorbate 60 and/or polysorbate 80, more preferably polysorbate 60;

0.01% to 2% (w:w) of a sucrose ester, preferably a sucrose ester comprising mainly (or consisting essentially of, or consisting of) sucrose monostearate;

possibly (optionally) 0.5% to 2% of an additional emulsifier selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and/or combinations thereof;

possibly (optionally) 10% to 35% (w:w) of a sweetener;
possibly (optionally) 1% to 6% (w:w) of a stabilizer;
possibly (optionally) 0.1% to 0.5% (w:w) of salt; and
up to 100% (w:w) of water.

More preferably, an emulsion of the invention is an UHT-treated edible oil-in-water emulsion, even more preferably free of protein, comprising:

20% to 30% (w:w) of a vegetable lauric fat, possibly a trilaurin-enriched vegetable lauric fat, said fat having a trilaurin triglyceride content higher than 20%, preferably higher than 21%, more preferably higher than 22% (w:w);

0.1% to 1% (w:w) of a polysorbate, preferably polysorbate 60 and/or polysorbate 80, more preferably polysorbate 60;

0.01% to 2% (w:w) of a sucrose ester, preferably a sucrose ester comprising mainly (or consisting essentially of, or consisting of) sucrose monostearate;

0.5% to 2% of an additional emulsifier selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and/or combinations thereof;

10% to 35% (w:w) of a sweetener, such as an edible sweetening carbohydrate, a sugar or a sugar alcohol, and preferably fructose, sucrose, and/or dextrose;

1% to 6% (w:w) of a stabilizer, preferably selected from the group consisting of alginate, carrageenan, locust bean gum, guar gum, xanthan gum, microcrystalline cellulose, carboxymethylcellulose and polyols, and combinations or two or more thereof; and up to 100% (w:w) of water.

Depending on the requirements for the final product, in particular taste or color sought, other optional ingredients (commonly used in already available vegetable creams), such as salts, flavorings and/or coloring agents, can be further added in a minor amount, preferably up to 1% (w:w).

The present invention also relates to a method for preparing the edible oil-in-water emulsion of the invention, preferably UHT-treated.

Preferably, a method for preparing the emulsion according to the invention, comprises the steps of:

forming the oily phase comprising between 20% and 30% (w:w) of a vegetable fat, preferably a lauric vegetable fat, wherein said vegetable fat comprises more than 20% (w/w) of trilaurin triglyceride, and more preferably more than 21% (w:w) of trilaurin triglyceride, preferably said oily phase further comprising a sucrose ester;

separately, forming the aqueous phase preferably comprising a polysorbate, heating each phase, preferably between about 60° and 75° C., admixing both phases, and homogenizing, UHT treating, preferably during 2 seconds to 4 seconds at 135° C. to 150° C., cooling the emulsion, and possibly (optionally) packing the emulsion.

Preferably, in a method for preparing the emulsion according to the invention, the components and their amounts are those described for the emulsion according to the invention.

Preferably, a method for preparing the emulsion according to the invention, comprises the steps of:

forming the oily phase comprising between 20% and 30% (w:w) of a vegetable fat, wherein the said vegetable fat comprises more than 20% (w/w) of trilaurin triglyceride, and more preferably more than 21% (w:w) of trilaurin triglyceride, and between 0.01% to 2% of a sucrose ester, said sucrose ester comprising preferably more than 50% of sucrose mono-stearate, and even more preferably more than 70% of sucrose mono-stearate, separately, forming the aqueous phase preferably comprising a polysorbate, more preferably polysorbate 60 and/or 80, even more preferably polysorbate 60, heating each phase, preferably between about 60° and 75° C., admixing both phases, and homogenizing, UHT treating, preferably during 2 seconds to 4 seconds at 135° C. to 150° C., cooling the emulsion, and possibly (optionally) packing the emulsion.

The present invention also relates to a method for preparing the whipped edible oil-in-water emulsion of the invention, preferably UHT-treated, comprising the steps of the method for preparing the emulsion according to the invention, and further comprising the step of whipping the emulsion, preferably at room temperature.

The present invention also relates to the use of the emulsion according to the invention in a food product and/or for stabilizing the emulsion after whipping.

DETAILED DESCRIPTION OF THE INVENTION

Figure 1:
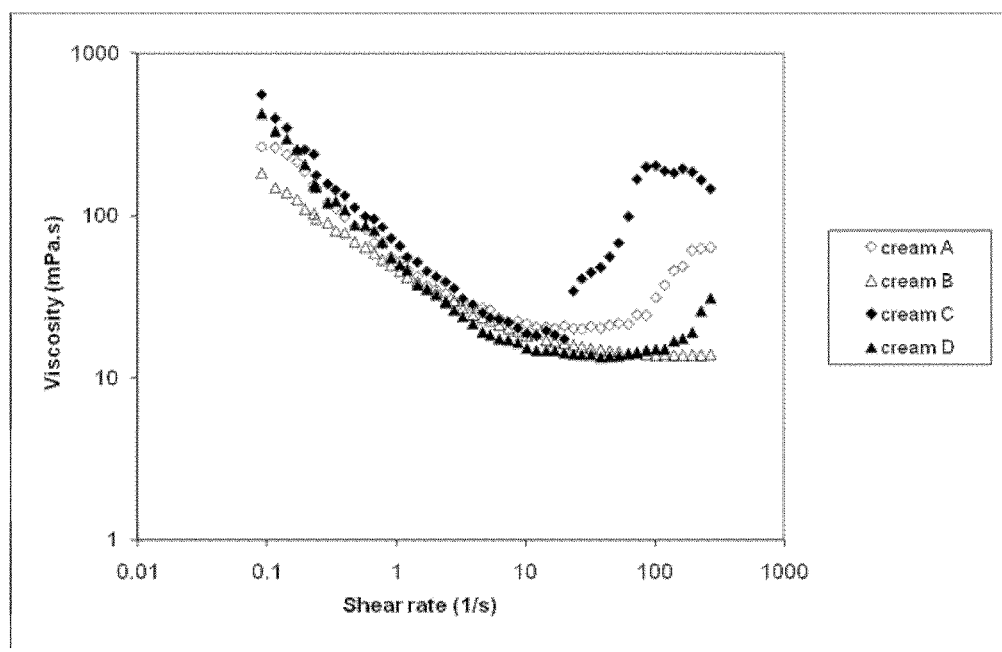
FIG. 1 represents the viscosity of model creams in function of shear stress, measured at 20° C.

The inventors have found that by using a specific combination of ingredients they obtained an oil-in-water emulsion that can be whipped at room temperature, that is very stable and that can be stored for a long time without refrigeration.

Furthermore the whipped product presents excellent properties with regard to its overrun, stability, sculptability, texture, and smoothness.

More particularly, the inventors have found that lauric fats, derived from palm kernel and/or from coconut (e.g. hydrogenated or fractionated; for instance palm kernel oil (PKO), hydrogenated palm kernel oil (HPKO), coconut oil, palm kernel stearin (PKS) and/or hydrogenated palm kernel stearin (HPKS), with a lauric acid content constantly higher than 40% w:w (i.e. $w_{La}:w_{\Sigma fatty\ acids}$) and preferably comprised between 44% and 57%; exhibit very different trilaurin triglyceride contents, e.g. varying from 13% to 24% w:w, which has a direct impact on the emulsion stability (see Table 1a and 1b).

Table 1a gives the triglyceride composition of nine different examples of lauric oils and fats (%), measured by Gas Chromatography with a Flame Ionization Detector (GC-FID). These examples are not meant to be representative of their kind.

|     |         | PKS1 | HPKS1 | HPK1 | HPKl1 | Coco1 | HPKO1 | HPKO2 | HPKO3 | HPKO4 |
|-----|---------|------|-------|------|-------|-------|-------|-------|-------|-------|
| C26 | unknown |      |       |      |       |       | 0.08  | 0.32  | 0.19  | 0.23  |
| C28 | CyLaCy  |      |       |      |       |       | 0.38  | 0.32  | 0.49  | 0.29  |
| C30 | LaCCy   | 0.17 | 0.18  | 0.61 | 0.56  | 1.8   | 0.56  | 0.62  | 0.54  | 0.60  |
|     | LaCaLa  | 0.19 | 0.19  | 0.73 | 0.49  | 1.15  | 0.42  | 0.84  | 0.63  | 0.82  |
| C32 | LaCyLa  | 2.59 | 2.69  | 6.48 | 5.32  | 11.2  | 3.79  | 5.71  | 3.96  | 5.61  |
|     | LaCaM   | 0.12 | 0.13  | 0.46 | 0.31  | 1.05  | 0.33  | 0.30  | 0.10  | 0.28  |
| C34 | LaCLa   | 3.41 | 3.67  | 5.2  | 4.13  | 6.61  | 4.80  | 7.85  | 5.10  | 7.60  |
|     | LaCM    | 1.96 | 2.04  | 3.79 | 3.15  | 9.08  |       |       |       |       |
|     | CCaP    | 0.05 | 0.07  | 0.21 | 0.24  | 0.58  | 0.30  | 0.22  | 0.27  | 0.21  |

-continued

| | | PKS1 | HPKS1 | HPK1 | HPKI1 | Coconut1 | HPKO1 | HPKO2 | HPKO3 | HPKO4 |
|---|---|---|---|---|---|---|---|---|---|---|
| C36 | LaLaLa | 22.04 | 24.12 | 22.29 | 17.97 | 14.15 | 13.82 | 20.74 | 15.28 | 20.76 |
| | LaCyP | 1 | 1.01 | 1.81 | 1.75 | 4.88 | | | | |
| | unknown | | | | | 0.26 | | | | |
| | unknown | | | | | 0.16 | | | | |
| C38 | LaMLa | 20.21 | 22.92 | 15.91 | 14.33 | 14.2 | 10.65 | 14.83 | 11.64 | 14.61 |
| | LaCyS | 0.39 | 0.71 | 1.5 | 2.58 | 1.91 | 3.93 | 2.60 | 3.72 | 2.65 |
| | unknown | 0.27 | 0.02 | 0.33 | 0.02 | 1.51 | | | | |
| | unknown | | | | | 0.16 | | | | |
| C40 | LaMM | 12.44 | 14.57 | 9.28 | 10.63 | 10.4 | 12.41 | 11.51 | 12.23 | 11.44 |
| | LaCyS | 0.07 | 0.27 | 0.49 | 0.83 | | | | | |
| | unknown | 0.16 | 0.02 | 0.19 | | 0.73 | | | | |
| | unknown | 0.17 | | 0.19 | | 0.34 | | | | |
| C42 | LaMP | 6.17 | 9.53 | 7.18 | 13.54 | 5.58 | 19.62 | 12.75 | 19.46 | 13.13 |
| | LaOCy | 1.61 | 0.28 | 2.09 | 0.61 | 1.85 | 0.59 | 0.66 | 0.61 | 0.70 |
| | unknown | 0.13 | 0.01 | 0.26 | | 0.27 | | | | |
| | unknown | 0.2 | 0.02 | 0.11 | | 0.19 | | | | |
| | unknown | | | | | 0.09 | | | | |
| C44 | LaMS | 2.67 | 5.6 | 4 | 7.52 | 2.27 | 10.41 | 7.12 | 10.38 | 7.34 |
| | MMP | 1.64 | 0.31 | 2.04 | 0.64 | 1.6 | 0.62 | 0.58 | 0.74 | 0.74 |
| | unknown | 0.03 | | 0.22 | | 0.03 | | | | |
| | unknown | 0.31 | | 0.24 | | 0.49 | | | | |
| | unknown | | | | | 0.06 | | | | |
| C46 | PPM | 1.41 | 4 | 2.95 | 5.17 | 0.71 | 6.67 | 4.96 | 6.09 | 4.98 |
| | unknown | 1.57 | 0.04 | 1.6 | 0.04 | 1.31 | | | | |
| | unknown | 0.22 | | 0.15 | | 0.43 | | | | |
| | unknown | 0.04 | | 0.02 | | 0.04 | | | | |
| C48 | PPP | 11.29 | 3.42 | 2.66 | 5.36 | 0.3 | 7.41 | 4.81 | 6.56 | 4.88 |
| | PSM | 0.75 | | 1.43 | 0.04 | 0.75 | 1.86 | 0 | 0 | 0 |
| | unknown | 0.67 | | 0.7 | | 0.42 | | | | |
| | unknown | 0.2 | | 0.14 | | 0.22 | | | | |
| | unknown | | | | | 0.17 | | | | |
| C50 | PPS | 1.43 | 1.53 | 0.99 | 2 | 0.04 | 0.19 | 1.63 | 1.64 | 1.51 |
| | POP | 1.68 | 0.08 | 0.56 | 0.13 | 0.55 | | | | |
| | PLP | 0.24 | | 0.18 | 0.03 | 0.3 | | | | |
| | unknown | 0.28 | | 0.01 | | 0.2 | | | | |
| | unknown | 0.06 | | 0.03 | | 0.16 | | | | |
| C52 | PSS | 0.15 | 1.27 | 0.79 | 1.35 | 0.01 | 0.66 | 0.98 | 0.37 | 0.97 |
| | POS | 0.29 | 0.03 | 0.43 | 0.03 | 0.09 | 0.13 | 0 | 0 | 0 |
| | POO + OPO | 0.7 | 0.06 | 0.32 | 0.08 | 0.45 | 0.37 | 0.65 | 0 | 0.65 |
| | unknown | 0.04 | | | | 0.04 | | | | |
| | unknown | 0.25 | 0.02 | 0.11 | 0.06 | 0.38 | | | | |
| | unknown | 0.05 | | 0.03 | | 0.19 | | | | |
| C54 | SSS | 0.05 | 1.12 | 0.62 | 1.09 | | | | | |
| | SOS | 0.11 | 0.01 | 0.35 | | | | | | |
| | unknown | 0.15 | | 0.18 | | 0.07 | | | | |
| | unknown | 0.25 | 0.04 | 0.14 | | 0.37 | | | | |
| | unknown | 0.12 | 0.02 | | | 0.2 | | | | |

| Abbreviation used in Table 1a | Meaning |
|---|---|
| Cy | Caprylic acid residue (C 8) |
| Ca | Capric acid residue (C 10) |
| La | Lauric acid residue (C 12) |
| M | Myristic acid residue (C 14) |
| P | Palmitic acid residue (C 16) |
| S | Stearic acid residue (C 18:0) |
| O | Oleic acid residue (C 18:1 cis) |

TABLE 1b fatty acids composition

| | PKS1 | HPKS1 | HPK1 | HPKI1 | Coconut1 | HPKO1 | HPKO2 | HPKO3 | HPKO4 |
|---|---|---|---|---|---|---|---|---|---|
| C 6 | | | 0.16 | 0.16 | 0.37 | | | | |
| C 8 | 1.55 | 1.75 | 3.25 | 3.26 | 6.49 | 2.58 | 2.91 | 2.58 | 3.2 |
| C 10 | 2.46 | 2.75 | 3.36 | 3.37 | 5.71 | 2.7 | 3.09 | 2.71 | 3.31 |
| C 12 | 48.5 | 54.56 | 48 | 47.34 | 46.37 | 39.69 | 44.97 | 41.87 | 47.33 |
| C 14 | 18.26 | 21.25 | 15.68 | 15.39 | 17.88 | 14.15 | 16.3 | 15.2 | 16.22 |
| C 16:0 | 17.6 | 9.1 | 8.69 | 9.17 | 9.47 | 10.08 | 9.65 | 9.36 | 8.68 |
| C 18:0 | 3.21 | 9.82 | 13.25 | | 2.91 | 29.88 | 20.9 | 27.31 | 20.82 |
| C 18:1 trans | | | | 2.13 | 20.5 | | | | |
| C 18:1 cis | 7.27 | 0.41 | 4.39 | 0.36 | 7.66 | 0.46 | 1.55 | 0.54 | 0.15 |
| C 18:2 cis | 1.15 | 0.23 | 0.77 | 0.2 | 3.15 | 0.14 | 0.37 | 0.07 | 0.06 |
| C 18:3 | | 0.14 | 0.18 | 0.24 | | | | | |
| C 20:1 | | | | 0.01 | | | | | |

TABLE 1b-continued

| | PKS1 | HPKS1 | HPK1 | HPKI1 | Coconut1 | HPKO1 | HPKO2 | HPKO3 | HPKO4 |
|---|---|---|---|---|---|---|---|---|---|
| C 18:3 | | | 0.03 | | 0.31 | 0.24 | | 0.37 | 0.24 |
| C 22 | | | 0.04 | | | | | | |
| C 24:1 | | | 0.07 | | | | | | |

In particular, a lauric fat with a content in trilaurin triglyceride (LaLaLa) higher than 20%, preferably higher than 21%, or even higher than 22%, 23%, or 24% (w:w) confers to the emulsion of the invention an improved stability, in particular a stability to the variations of the conservation/storage temperature.

Furthermore the stability of the whipped cream is increased, since the whipped cream remains unchanged (i.e. no change can be measured, noticed or perceived).

This lauric fat may be obtained by extraction from vegetable source, possibly followed by a further purification step, or an enrichment step, or may be obtained by chemical or enzymatic synthesis, or by chemical or enzymatic modification of an oil or a fat.

Possibly the enrichment of a fat in the trilaurin triglyceride is performed by a physical treatment (such as fractionation by crystallization), and/or by enzymatic treatment(s) of this fat (such as transesterification).

Advantageously, physical and enzymatic treatments are coupled.

In addition, the inventors have found that a specific combination of emulsifiers is particularly advantageous to obtain an emulsion with improved properties.

In particular, a combination of a polysorbate and a sucrose ester has been shown to give excellent results compared to isolated ingredients. This specific combination of emulsifiers is especially advantageous for improving the properties of emulsions based on trilaurin triglyceride-enriched fats or oils.

The sucrose esters (also referred to herein as sucroesters) are obtained by reaction of sucrose (i.e. disaccharide derived from glucose and fructose) with one or more fatty acids having a linear chain with an even number of carbon atoms ranging from 12 to 18.

Preferred sucrose esters are selected from the group consisting of sucrose mono-stearate, sucrose mono-palmitate, sucrose mono-oleate, sucrose mono-myristate, and sucrose mono-laurate. Even more preferred said sucroester is sucrose mono-stearate.

Preferably, said sucrose esters comprise mainly (i.e. as the main component) sucrose mono-stearate.

Preferably, said sucrose esters comprise (or consist of) at least 50%, more preferably at least 70% (w:w) of sucrose mono-stearate, and one or more other sucrose esters up to 100%. More preferably, said sucrose esters comprise (or consist of) at least 70% (w:w) of sucrose mono-stearate, and sucrose di-stearate up to 100%.

Polysorbates are a class of emulsifiers obtained by esterification of polyethoxylated sorbitan with fatty acids.

Preferably, said polysorbate is polyoxyethylene (20) sorbitan monostearate, also referred to as polysorbate 60 (e.g. Tween® 60), and/or polyoxyethylene (20) sorbitan monooleate, also referred to as polysorbate 80 (e.g. Tween® 80). More preferably, said polysorbate is polysorbate 60. The number 20 following the polyoxyethylene part refers to the total number of oxyethylene —($CH_2CH_2O$)— groups found in the molecule. The number following the polysorbate part is related to the type of fatty acid associated with the polyoxyethylene sorbitan part of the molecule. Monostearate is indicated by 60 and monooleate by 80.

A particularly preferred combination is polysorbate 60 and/or 80 with sucrose mono-stearate, and even more preferably polysorbate 60 with sucrose mono-stearate.

With such a combination used in an emulsion of the present invention, wherein the fat comprises a trilaurin content higher than 20%, more particularly higher than 21% (w:w), the resulting emulsion is whippable in a very broad temperature range, i.e. from about 4° C. to room temperature. The overrun is higher than 200. The whipping time stays in the normal range for vegetable creams.

There is a synergistic effect of the combination of said lauric fat, said polysorbate, and said sucrose monostearate.

In the context of the present invention, the term "trilaurin triglyceride" (also referred to herein as "trilaurin") refers to a triglyceride made of a glycerol moiety esterified by three lauric acid (C12) residues.

In the context of the present invention, the term "natural fat", or "natural oil", refers respectively to a fat or an oil obtained by extraction from a plant (preferably a naturally-occurring plant), possibly further degummed, bleached and/or refined, but not fractionated, hydrogenated, nor interesterified.

In the context of the present invention, "trilaurin-enriched fat" refers to a fat wherein the trilaurin triglyceride content is increased in comparison with the trilaurin content of the "natural fat", by any process, such as fractionation, hydrogenation, and/or interesterification.

For instance, the enrichment can be performed by the specific addition of trilaurin triglycerides.

Preferably, a trilaurin-enriched fat has a trilaurin triglyceride content that is at least 5% higher than the trilaurin content of the natural fat, and more preferably at least 10% higher, or even at least 20% higher.

Preferably, a trilaurin-enriched fat to be used in an emulsion of the invention comprises more than 20%, more preferably at least 21% or 22%, even more preferably at least 23% or 24% (w:w) of trilaurin triglyceride, based on the total weight of triacylglycerol of the fat.

In the context of the present invention, the term "lauric fat" refers to a fat wherein lauric fatty acid (C12) is the most abundant of the fatty acids (w:w), based on the total weight of the fatty acids.

In the context of the present invention, the term "room temperature" refers to the temperature range of (about) 20° C. to 25° C.

The present invention provides an edible oil-in-water emulsion wherein the oily phase comprises (or comprises mainly, or consists essentially of, or consists of) a trilaurin triglyceride enriched fat.

The present invention also provides an edible oil-in-water emulsion wherein the oily phase comprises (or comprises mainly, or consists essentially of, or consists of) a fat, possibly a trilaurin triglyceride enriched fat, said fat having a trilaurin triglyceride content higher than 20%, preferably higher than 21%, more preferably higher than 22%, even more preferably higher than 23% (w:w).

More particularly, the present invention provides an edible oil-in-water emulsion comprising between 20% and 30% (w:w) of said fat, and preferably one or more emulsifiers.

Preferably, the edible oil-in-water emulsion is an UHT-treated edible oil-in-water emulsion.

Preferably, the (UHT-treated) edible oil-in-water emulsion comprises no animal fat, and the fat is a non-dairy fat.

Preferably, the (UHT-treated) edible oil-in-water emulsion comprises no protein, in particular no animal protein, and even no protein source at all.

Preferably the fat comprises more than 20%, or at least 21%, 22%, 23%, 24%, 25%, 26%, 27%, 28%, 29%, 30% (w:w) of trilaurin triglyceride.

In particular, the fat comprises less than 50%, 45%, 40%, 39, 38, 37, 36, 35, 34% (w:w) of trilaurin triglyceride. And more particularly, the trilaurin content of said fat is more than 20% and less than 50% (w:w), preferably comprised between 21% and 45% (w:w), more preferably between 22% and 40% (w:w), more preferably between 23% and 35% (w:w), even more preferably between 24% and 35% (w:w).

Preferably, the fat is a vegetable lauric fat. More preferably, said vegetable lauric fat comprises between 44% and 54% (w:w) of lauric acid, still more preferably between 45% and 48% (w:w) of lauric acid.

Advantageously, the fat is coconut oil, and/or palm kernel oil, possibly further processed for obtaining partially hydrogenated coconut oil, fully hydrogenated coconut oil, coconut stearin, coconut olein, and/or interesterified coconut oil, partially hydrogenated palm kernel oil, fully hydrogenated palm kernel oil, palm kernel stearin, palm kernel olein, and/or interesterified palm kernel oil.

Preferably, the fat is hydrogenated and, more preferably, this hydrogenated fat has a trans fatty acid content of less than 2%, less than 1% (w:w), and even more preferably is free of trans fatty acid.

Advantageously, the fat is selected from the group consisting of coconut oil, palm kernel oil, partially hydrogenated coconut oil, fully hydrogenated coconut oil, partially hydrogenated palm kernel oil, fully hydrogenated palm kernel oil, coconut stearin, coconut olein, interesterified coconut oil, palm kernel stearin, hydrogenated palm kernel stearin, palm kernel olein, interesterified palm kernel oil, and any combination thereof.

Advantageously, the fat comprises between 20% and 25% (w:w) of C18 fatty acid(s), this C18 fatty acid being essentially stearic acid. More particularly, the fat comprises more than 20% (w:w) of stearic acid.

Alternatively, this fat is partially hydrogenated and possibly has an iodine value lower than 10, preferably lower than 7, more preferably lower than 5 or even lower than 3. Preferably, the partially hydrogenated fat has an iodine value higher than 2.

Advantageously, the solid fat content of the fat is comprised between 90% and 98% at 10° C., being more preferably comprised between 92% and 97%, still more preferably between (about) 95% and (about) 96%.

Advantageously, the solid fat content of the fat is comprised between 75% and 96% at 20° C., being more preferably comprised between 80% and 90%, still more preferably between 85% and 88%, being possibly (about) 87%.

Advantageously, the solid fat content of the fat is comprised between 28% and 65% at 30° C., preferably between 30% and 45%, possibly of about 34%.

Advantageously, the solid fat content of the fat is comprised between 2% and 13% at 35° C.

Advantageously, the solid fat content of the fat is less than 3% at 40° C.

Preferably, the solid fat content of the fat is comprised between 90% and 98% at 10° C.; between 75% and 96% at 20° C. (being more preferably comprised between 80% and 90% at 20° C.); between 28% and 65% at 30° C.; between 2% and 13% at 35° C.; and is less than 3% at 40° C.

Preferably, an (UHT-treated) edible oil-in-water emulsion of the invention comprises between 0.01% and 2% (w:w) of emulsifiers.

Advantageously, the emulsifier or the mixture of emulsifiers of this oil-in-water emulsion is protein-free.

Preferably the emulsifier(s) comprise(s) (or consist(s) of) sucrose ester(s).

Advantageously said sucrose ester comprises mainly stearic acid residue(s). In particular, more than 50%, 60%, 70%, 80%, 90%, 95%, 96%, 97%, 98%, 99% or even 100% of the fatty acid residues are stearic acid residues.

More preferably, said sucrose ester (s) consist(s) essentially of sucrose ester(s) of stearic acid.

Preferably said sucrose esters comprise more than 70% (w:w) of the mono ester of sucrose, possibly in addition to less than 30% (w:w) of di-ester of sucrose.

More preferably, said sucrose esters comprise more than 50%, even more preferably more than 70% (w:w), of sucrose mono-stearate.

Possibly, this sucrose ester present in this edible composition is based on 70% (w:w) of sucrose mono stearate and on 30% (w:w) of sucrose di stearate.

Preferably, the oil-in-water emulsion of the invention (further) comprises a polysorbate (preferably between 0.1% and 1% (w:w)), more preferably polysorbate 60 and/or polysorbate 80, even more preferably polysorbate 60.

Preferably, the oil-in-water emulsion of the invention further comprises (more preferably between 0.1% and 1% (w:w)) another emulsifier (in addition to the sucrose ester and/or to the polysorbate), more preferably selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and/or combinations thereof.

Preferably, the emulsion of the present invention further comprises sweeteners.

Preferably, said oil-in-water emulsion comprises between 10% and 35% (w:w) of sweetener(s), more preferably between 12% and 30%.

A sweetener to be used in an oil-in-water emulsion of the invention can be any edible sweetening carbohydrate, sugar or sugar alcohol. Artificial sweeteners may also be added, preferably in a minor quantity.

A preferred sweetener comprises (or consists of) one or more sugars, more particularly fructose, sucrose, dextrose and/or fructose, sucrose or dextrose syrup.

Said sweetener(s) can be in a granulated or powdered form.

Preferably, said oil-in-water emulsion further comprises between 1% and 6% (w:w) of a stabilizer, or a mixture of stabilizers, more preferably between 2% and 4% (w:w).

Preferred stabilizers are polysaccharides (made of natural or synthetic hydrocolloids), for example alginate, carrageenan, locust bean gum, guar gum, xanthan gum, microcrystalline cellulose, carboxymethylcellulose and possibly other food grade carbohydrates or polyols, for example sorbitol.

More preferably said oil-in-water emulsion comprises one or more sweeteners and one or more stabilizers.

Preferably, the edible emulsion contains less than 0.5% (w:w) of protein and more preferably is protein-free.

Preferably, an emulsion of the invention is an UHT-treated edible oil-in-water emulsion, more preferably free of protein, comprising:

20% to 30% (w:w) of a vegetable lauric fat, possibly a trilaurin enriched vegetable lauric fat, said fat having a trilaurin content higher than 20%, preferably higher than 21%, more preferably higher than 22% (w:w);

0.1% to 1% (w:w) of a polysorbate, preferably polysorbate 60 and/or polysorbate 80, more preferably polysorbate 60;

0.01% to 2% (w:w) of a sucrose ester, preferably a sucrose ester comprising mainly (or consisting of) sucrose monostearate;

possibly (optionally) 0.5% to 2% of an additional emulsifier selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and/or combinations thereof;

possibly (optionally) 10% to 35% (w:w) of a sweetener;
possibly (optionally) 1% to 6% (w:w) of a stabilizer;
possibly (optionally) 0.1% to 0.5% (w:w) of salt; and
up to 100% (w:w) of water.

Preferably, an emulsion of the invention is an UHT-treated edible oil-in-water emulsion, more preferably free of protein, comprising:

20% to 30% (w:w) of a vegetable lauric fat, possibly a trilaurin enriched vegetable lauric fat, said fat having a trilaurin content higher than 20%, preferably higher than 21%, more preferably higher than 22% (w:w);

0.1% to 1% (w:w) of a polysorbate, preferably polysorbate 60 and/or polysorbate 80, more preferably polysorbate 60;

0.01% to 2% (w:w) of a sucrose ester, preferably a sucrose ester comprising mainly (or consisting of) sucrose monostearate;

0.5% to 2% of an additional emulsifier selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and/or combinations thereof;

10% to 35% (w:w) of a sweetener;
1% to 6% (w:w) of a stabilizer; and
up to 100% (w:w) of water.

Depending on the requirements for the final product, other optional ingredients (commonly used in already available vegetable creams), such as salts, flavorings and/or coloring agents, can be further added in a minor amount.

The present invention also provides a method for preparing an edible oil-in-water emulsion according to the invention.

A method for preparing an edible oil-in-water emulsion according to the invention comprises the step of admixing an aqueous phase to an oily phase, said oily phase comprising (or consisting of) a fat, possibly a trilaurin triglyceride enriched fat, said fat having preferably a trilaurin triglyceride content higher than 20%, more preferably higher than 21%, even more preferably higher than 22%, and even more preferably higher than 23% (w:w).

More particularly, in a method for preparing an edible oil-in-water emulsion of the invention, said fat is added to an amount between 20% and 30% (w:w). Preferably one or more emulsifiers are further added.

In said method for preparing an edible oil-in-water emulsion, the fat used is the same, and in the same proportion, as described for an emulsion object of the present invention.

In said method for preparing an edible oil-in-water emulsion, the ingredients used are the same, and in the same proportions, as described for an emulsion object of the present invention.

Preferably, said method for preparing an edible oil-in-water emulsion further comprises the step of treating the emulsion by UHT.

Preferably, said method for preparing an edible oil-in-water emulsion comprises no animal fat addition, and the fat added is a non-dairy fat.

Preferably, said method for preparing an edible oil-in-water emulsion comprises no protein addition, in particular no animal protein addition, and even no introduction of any protein source at all.

Preferably, said method for preparing an edible oil-in-water emulsion comprises the steps of:

admixing the ingredients for forming the oily phase,
separately, admixing the ingredients for forming the aqueous phase,
heating both phases, preferably between about 60° and 75° C.,
admixing both phases, and homogenizing,
UHT treating, preferably during 2 seconds to 4 seconds at 135° C. to 150° C.,
cooling the emulsion, and
possibly (optionally) packing the emulsion.

Said method for preparing an edible oil-in-water emulsion can further comprise the step of whipping the emulsion, preferably at room temperature, for preparing the whipped cream.

The whipped cream thus obtained is also an object of the present invention.

Another aspect of the present invention is a method for stabilizing (or for increasing the stability of) an edible oil-in-water emulsion, comprising the step of adding a trilaurin triglyceride enriched fat.

Also provided is a method for stabilizing a whipped edible oil-in-water emulsion, comprising the step of adding a trilaurin triglyceride enriched fat.

Preferably, said method for stabilizing a (whipped) edible oil-in-water emulsion comprises the step of mixing an aqueous phase to an oily phase, said oily phase comprising (or comprising mainly, or consisting essentially of, or consisting of) a trilaurin triglyceride enriched fat.

Preferably, in said method for stabilizing a (whipped) edible oil-in-water emulsion, the fat used is the same as described for an emulsion object of the present invention; and preferably also in the same proportion.

Preferably, in said method for stabilizing a (whipped) edible oil-in-water emulsion, the ingredients used are the same as described for an emulsion object of the present invention; and preferably also in the same proportions.

Preferably, in said method for stabilizing a (whipped) oil-in-water emulsion, the oil-in-water emulsion comprises:

20% to 30% (w:w) of a vegetable lauric fat, possibly a trilaurin enriched vegetable lauric fat, said fat having a trilaurin content higher than 20%, preferably higher than 21%, more preferably higher than 22% (w:w);

0.1% to 1% (w:w) of a polysorbate, preferably polysorbate 60 and/or polysorbate 80, more preferably polysorbate 60;

0.01% to 2% (w:w) of a sucrose ester, preferably a sucrose ester comprising mainly (or consisting of) sucrose monostearate;

possibly (optionally) 0.5% to 2% of an additional emulsifier selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and/or combinations thereof;

possibly (optionally) 10% to 35% (w:w) of a sweetener;
possibly (optionally) 1% to 6% (w:w) of a stabilizer;
possibly (optionally) 0.1% to 0.5% (w:w) of salt; and
up to 100% (w:w) of water.

Preferably, in said method for stabilizing a (whipped) oil-in-water emulsion, the oil-in-water emulsion comprises:

20% to 30% (w:w) of a vegetable lauric fat, possibly a trilaurin enriched vegetable lauric fat, said fat having a trilaurin content higher than 20%, preferably higher than 21%, more preferably higher than 22% (w:w);

0.1% to 1% (w:w) of a polysorbate, preferably polysorbate 60 and/or polysorbate 80, more preferably polysorbate 60;

0.01% to 2% (w:w) of a sucrose ester, preferably a sucrose ester comprising mainly (or consisting of) sucrose monostearate;

0.5% to 2% of an additional emulsifier selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and/or combinations thereof;

10% to 35% (w:w) of a sweetener;
1% to 6% (w:w) of a stabilizer;
possibly (optionally) 0.1% to 0.5% (w:w) of salt; and
up to 100% (w:w) of water.

Preferably, said method for stabilizing a (whipped) edible oil-in-water emulsion further comprises the step of treating the emulsion by UHT.

Preferably, said method for stabilizing a (whipped) edible oil-in-water emulsion comprises no animal fat addition, and the fat added is a non-dairy fat.

Preferably, said method for stabilizing a (whipped) edible oil-in-water emulsion comprises no protein addition, in particular no animal protein addition, and even no introduction of any protein source at all.

In a method for stabilizing a whipped edible oil-in-water emulsion, the step of whipping the emulsion is preferably performed at room temperature.

EXAMPLES

Measurement of Trilaurin Triglyceride Content

A suitable method for determining the content of trilaurin triglyceride in a fat is an analysis by GC-FID (Gas Chromatography with a Flame Ionization Detector).

Process for the Preparation of a Vegetable Cream

The process steps carried out to produce the UHT vegetable cream/emulsion of this invention are conventional in nature.

The ingredients are dispersed or solubilized in two separate tanks, respectively an oily phase tank (for the vegetable fat, some emulsifiers, some coloring agents if any), and an aqueous phase tank (for the water, sugar, some emulsifiers, stabilizers, and optionally flavors and/or salts).

After blending while heating to 65° C.-75° C., the two phases are mixed together.

The cream/emulsion can be sterilized by UHT (Ultra High Temperature) treatment, for example during 2 to 4 seconds at 135°-150° C., homogenized and cooled to below 15° C., before being fed to a filling equipment, for example a Tetra Pak® or Bag-in-Box machine.

Process to Whip the Vegetable Cream 500 ml of the vegetable cream was whipped with a Hobart whipping device with a capacity of 5 liters at speed 2 until optimal consistency is reached (e.g. until soft peaks are obtained).

Conventional Parameters Used to Evaluate a Vegetable Cream and a Whipped Cream:

Overrun

Overrun describes the increase of volume of a whipped cream compared to the initial volume of the non-whipped cream. Overrun, expressed as % of incorporated air volume, was determined with the following formula:

$$\text{overrun}=100\times(Vf-Vi)/Vi;$$

wherein: Vi=initial volume of cream (before whipping); and Vf=volume of cream after whipping.

Stability

Stability of a whipped cream is estimated by evaluating its texture either visually or with the aid of a texturometer.

A softer whipped cream corresponds to a better workability and stability in the final application.

As referred to in the examples section, a good stability means a firm foam after whipping that stays unchanged (i.e. unnoticeable, or imperceptible change) during 24 h at 20° C.

Whipping Time

Whipping time is the time needed to whip a cream until the desired consistency is obtained (i.e. the cream has an acceptable stability and forms smooth peaks).

Syneresis

Syneresis is the measure of the loss of water of a whipped product during storage.

To measure syneresis, 50 g of the whipped product is put in a propylene buchner-filter on a graduated cylinder and incubated in a conditioned room at 20° C. After 24 hours, the quantity of liquid in the cylinder is measured in ml. This value represents the syneresis of the whipped product.

Example 1

Characterization of Model Creams with Different Lauric Fats

Four different model creams/emulsions were made with hydrogenated palm kernel oils with different trilaurin triglyceride (LaLaLa) content (see also their precise compositions in table 1).

The formulations were as described in table 2.

TABLE 2

| (ingredients in % w:w) | | | | |
|---|---|---|---|---|
| | cream A | cream B | cream C | cream D |
| HPKO1 (13.8% LaLaLa) | 29.5 | | | |
| HPKO2 (20.5% LaLaLa) | | 29.5 | | |
| HPKO3 (15% LaLaLa) | | | 29.5 | |
| HPKO4 (20.5% LaLaLa) | | | | 29.5 |
| Buttermilk (SA Corman) | 6.7 | 6.7 | 6.7 | 6.7 |
| water | 63.8 | 63.8 | 63.8 | 63.8 |

The creams were produced by homogenization of the ingredients at 75° C. with a high shear mixer (Ultra Turax)

during 2 minutes at 10000 rpm then cooled to 4° C. and characterized the following day.

The viscosity of the liquid creams as a function of shear rate has been evaluated by rheometry. The apparent viscosity was recorded at 20° C. as a function of shear rate, ranging from 0.07 to 300 s−1 with a 50 measurement logarithmic ramp using a rheometer Bohlin CVO 120 equipped with concentric cylinders (gap of 150 μm between the cylinders).

Results are shown on FIG. 1. Cream B was less subject to gelification at high shear rates.

The creams were whipped for 2 minutes with the instrument Schlagsahne Prüfgerät (Elektronik Malente/Host, Germany). This instrument measures the work used to rotate the whips and record consistency of cream during whipping.

After whipping, overrun and texture were evaluated.

Texture of the whipped creams was measured according to the following method.

Beakers (height of 35 mm and diameter of 52 mm) were filled to the brim with whipped creams. Texture was measured at 10° C. with a SMS TAXT2i/5 texturometer (Stable Micro Systems, Surrey, UK) at 10° C. A conical probe (height of 10 mm, diameter of 35 mm), was used to penetrate the whipped cream to a depth of 15 mm at 0.5 mm/s. Results were expressed (in Newton) as the force needed to penetrate the cream to the desired depth (hardness).

Results of overrun and texture of whipped creams are shown in table 3.

TABLE 3

| Cream | Overrun | Hardness (N) |
|---|---|---|
| A | 150.9 | 0.92 |
| B | 163.6 | 0.66 |
| C | 137.9 | 0.97 |
| D | 179.2 | 0.70 |

Creams B and D, prepared with and HPKO2 and HPKO4 (richer in trilaurin than HPKO1 or HPKO3), gave a better air incorporation, a higher volume, i.e. a lighter texture and a bigger volume of whipped cream, which are more interesting.

The whipped creams produced with HPKO rich in trilaurin triglyceride (LaLaLa) (i.e. higher than 20%) have a better workability.

Example 2

Vegetable Creams

Two vegetable creams with the composition of table 4 were prepared with two different HPKO according to the following process.

The oily phase and the aqueous phase were prepared separately and then mixed together at 65° C.

The oily phase contained the fat and the emulsifiers (polysorbate excepted).

The aqueous phase contained the water, polysorbate, stabilizers, sweeteners, and salt.

The emulsion was sterilized at 150° C. during 4 s, homogenized in a homogenizer (200 bars) and cooled by tubular heat exchangers to below 15° C. to obtain an oil-in-water emulsion.

TABLE 4

| (ingredients in % w/w) | | |
|---|---|---|
| | Cream E | Cream F |
| Water | 50-60 | 50-60 |
| HPKO1 (13.8% LaLaLa) | 26 | |
| HPKO4 (20.5% LaLaLa) | | 26 |
| Polysorbate 60 | 0.1-0.5 | 0.1-0.5 |
| Sorbitol, hydroxypropyl cellulose | 3.0-5.0 | 3.0-5.0 |
| sucrose | 10-13 | 10-13 |
| Milk proteins | 0.5-1 | 0.5-1 |
| Emulsifiers (without polysorbate) | 0.5-1 | 0.5-1 |
| Salt | 0.1-0.5 | 0.1-0.5 |

Viscosity and overrun were evaluated following the same methods as described in example 1.

Viscosity as a function of shear rate was measured for both creams following the method described in example 1.

Figure 2:
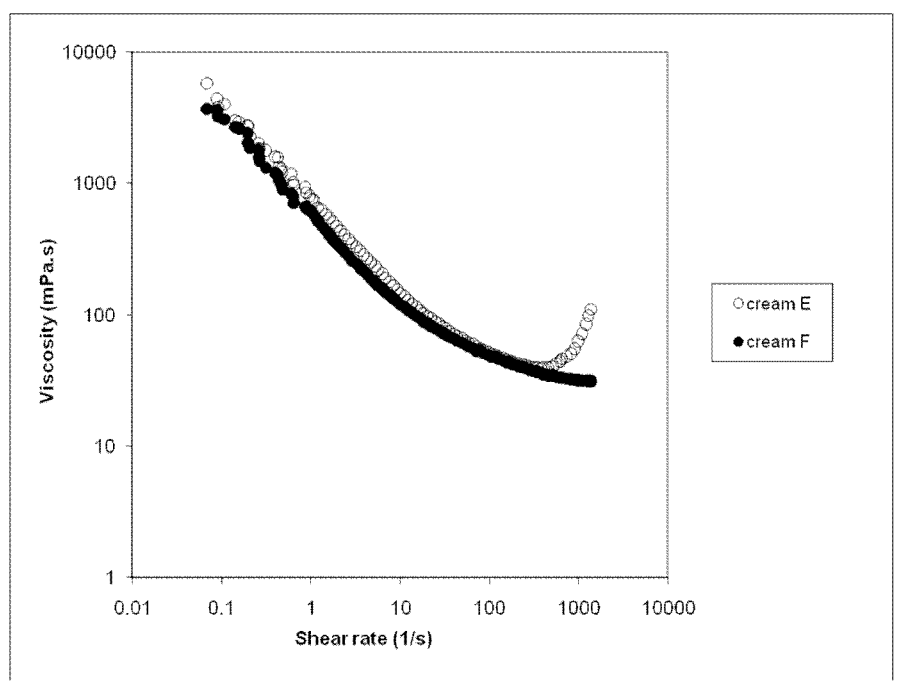
FIG. 2 represents the viscosity of vegetable creams in function of shear stress measured at 20° C.

The results are shown on FIG. 2. Cream E is less subject to gelification at high shear rates.

Table 5 gives the overrun results at 5-8° C. for the two vegetable creams, measured as described in example 1.

Cream F, prepared with a fat richer in trilaurin, has a significantly higher overrun.

TABLE 5

| Cream | Overrun (% air incorporated) |
|---|---|
| Cream E | 197.8 |
| Cream F | 228.4 |

Example 3

UHT Emulsions

UHT emulsions with the compositions of table 6 were prepared according to the same process as in example 2.

HPKO1 contains 13.8% (w:w) of triglyceride trilaurin (LaLaLa).

PKS1 is a palm-kernel stearin with an iodine value lower than 10, and contains 22.04% of triglyceride trilaurin (LaLaLa). This PKS1 fat is composed by about 48.5% (w:w) of lauric acid.

TABLE 6

| composition of UHT emulsions (values in % (w/w) of total weight of product) | | | | |
|---|---|---|---|---|
| | Cream G | Cream H | Cream I | Cream J |
| Water | 35-45 | 35-45 | 35-45 | 35-45 |
| HPKO1 | 26 | | | |
| PKS1 | | 26 | 26 | 26 |
| Polysorbate 60 | 0.15-0.35 | | 0.15-0.35 | 0.15-0.35 |
| sucrose monostearate | 0.01-0.1 | 0.01-0.1 | | 0.01-0.1 |
| cellulose derivates | 2-6 | 2-6 | 2-6 | 2-6 |
| sucrose, fructose | 25-35 | 25-35 | 25-35 | 25-35 |
| Salt | 0.1-0.5 | 0.1-0.5 | 0.1-0.5 | 0.1-0.5 |
| Emulsifiers (without polysorbate) | 0.5-1 | 0.5-1 | 0.5-1 | 0.5-1 |

The properties and qualities of the creams were evaluated 4 days after production by the whipping of these creams at a temperature between 5 and 8° C. and the measurement of whipping time, density of whipped product, stability after 24 hours and syneresis.

The results are shown in table 7.

TABLE 7

|  | Cream G | Cream H | Cream I | Cream J |
|---|---|---|---|---|
| Whipping time (minutes) | 6 m 28 sec | 8 m 05 s | 6 m 15 s | 6 m 20 s |
| Overrun | 204.32 | 218.88 | 214.47 | 213.68 |
| Stability | Soft texture, stability loss in time | Too firm texture, stability loss in time | Smooth and firm texture, no stability loss in time | Firm and very smooth texture, no stability loss in time |
| Syneresis (ml) | 0 | 0 | 0 | 0 |

This shows that the use of polysorbate 60 and sucrose monostearate provides an emulsion with good whipping properties and a very good stability.

The properties and qualities of the creams were evaluated 4 days after production by the whipping of these creams at a temperature between 20° C. and 25° C. and the measurement of whipping time, density of whipped product, stability after 24 hours and syneresis.

The results are shown in table 8.

TABLE 8

|  | Cream G | Cream H | Cream I | Cream J |
|---|---|---|---|---|
| Whipping time (minutes) | 7 m 14 s | 7 m 3 s | 5 m 46 | 5 m 0 s |
| Overrun | 213.09 | 215.36 | 233.67 | 247.58 |
| Stability | Soft and granular texture, stability loss in time | Firm and smooth, no stability loss in time | Firm and very smooth, stability loss in time | Firm and very smooth, no stability loss in time |
| Syneresis (ml) | 0 | 0 | 0 | 0 |

Cream H gives good results at 20° C., but not at 5° C.

The cream J, wherein PKS1, polysorbate and sucrose monostearate are combined, is the only cream that gives good results both at 5° C. and 20° C.

It can be deduced from the results obtained with cream J, that there is a synergistic effect of the combination of the particular lauric fat exhibiting a trilaurin content higher than 20%—in this example having a content higher than 21%, more particularly of 22.04% of trilaurin-, the polysorbate—in this example polysorbate 60-, and the sucrose ester—in this example sucrose monostearate. Indeed, the total effect of these three components used together is much greater than the sum of the effects if taken independently.

Whipped cream J at 20° C. is the cream exhibiting the best results in terms of density, stability and texture.

The invention claimed is:

1. A method for stabilizing an edible ultra high temperature (UHT)-treated oil-in-water emulsion, or a whipped edible UHT treated oil-in-water emulsion, comprising the step of mixing a processed vegetable fat with the aqueous phase to form said emulsion, wherein said processed vegetable fat comprises between 22% (w/w) and 34% (w/w) of trilaurin triglyceride based on the total amount of the triglycerides in said processed vegetable fat, wherein said UHT-treated oil-in-water emulsion comprises between 20% and 30% (w:w) of the processed vegetable fat, and wherein said edible UHT-treated oil-in-water emulsion further comprises between 0.01% (w/w) and 2% (w/w) of a sucrose ester, said sucrose ester comprising more than 70% of sucrose mono-stearate, and between 0.1% (w/w) and 1% (w/w) of a polysorbate, wherein the emulsion is whippable at room temperature to an overrun that is higher than 200% of incorporated air volume, and wherein after whipping the whipped product stays unchanged during 24 h at 20° C.

2. The method of claim 1, wherein the processed vegetable fat is a lauric fat.

3. The method of claim 1, wherein the polysorbate is polysorbate 60 and/or 80.

4. The method of claim 1, further comprising the step of adding an emulsifier selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and combinations of two or more thereof and/or a stabilizer selected from the group consisting of alginate, carrageenan, locust bean gum, guar gum, xanthan gum, microcrystalline cellulose, carboxymethylcellulose, sorbitol and combinations thereof.

5. The method of claim 1, wherein the processed vegetable fat is a lauric fat comprising between 44% and 57% (w/w) of lauric acid.

6. An edible ultra high temperature (UHT)-treated oil-in-water emulsion comprising between 20% and 30% (w:w) of a processed vegetable fat, wherein said processed vegetable fat comprises between 22% (w/w) and 34% (w/w) of trilaurin triglyceride based on the total amount of triglycerides in said processed vegetable fat, said edible UHT-treated oil-in-water emulsion further comprising between 0.01% (w/w) and 2% (w/w) of a sucrose ester, said sucrose ester comprising more than 70% (w/w) of sucrose mono-stearate, and between 0.1% (w/w) and 1% (w/w) of a polysorbate, wherein the emulsion is whippable at room temperature to an overrun that is higher than 200% of incorporated air volume, and wherein after whipping the whipped product stays unchanged during 24 h at 20° C.

7. The emulsion of claim 6, wherein the polysorbate is polysorbate 60 and/or 80.

8. The emulsion of claim 7, wherein the processed vegetable fat is a lauric fat.

9. The emulsion of claim 6, further comprising an emulsifier selected from the group consisting of polyglycerol esters, diacetyl tartaric acid esters of mono- and/or diglycerides, lactic acid esters of mono- and/or diglycerides, sodium stearoyl lactylate, lecithin, sorbitan monostearate, monoglycerides and combinations thereof and/or a stabilizer selected from the group consisting of alginate, carrageenan, locust bean gum, guar gum, xanthan gum, microcrystalline cellulose, carboxymethylcellulose, sorbitol and combinations thereof.

10. The emulsion of claim 6, which is protein free.

11. A method for preparing the emulsion of claim 6, comprising the steps of:
   forming an oily phase comprising the processed vegetable fat, wherein the said processed vegetable fat comprises between 22% (w/w) and 34% (w/w) of trilaurin triglyceride, and the sucrose ester, said sucrose ester comprising more than 70% (w/w) of sucrose mono-stearate,
   separately, forming an aqueous phase comprising the polysorbate,
   heating each phase between about 60° and 75° C.,
   admixing both phases, and homogenizing to form the emulsion, ultra high temperature treating,
cooling the emulsion, and
optionally packing the emulsion, wherein the emulsion comprises between 0.1% (w/w) and 1% (w/w) of the polysorbate.

12. A method for preparing a whipped emulsion comprising the step of whipping the emulsion of claim 6.

13. The method of claim 12, wherein the whipping step is performed at room temperature.

14. A food product comprising the emulsion of claim 6.

15. The emulsion of claim 6, wherein the processed vegetable fat is a lauric fat comprising between 44% and 57% (w/w) of lauric acid.

* * * * *